United States Patent Office 3,043,705
Patented July 10, 1962

3,043,705
COATED METAL ARTICLES AND COATING
COMPOSITIONS THEREFOR
Harry J. Kiefer, Jr., Cleveland, Ohio, assignor to The Glidden Company, Cleveland, Ohio, a corporation of Ohio
No Drawing. Filed May 8, 1958, Ser. No. 733,842
16 Claims. (Cl. 106—287)

This invention relates to novel epoxidized hydrocarbon drying oils, particularly to oils of the sodium-polymerized types. This application is a continuation in part of copending application Serial No. 515,208, filed June 13, 1955 and now abandoned.

The hydrocarbon drying oils heretofore available have had numerous shortcomings which have interfered with their extensive use in coating compositions. Many of the oils have dried only slowly, or have dried superficially to give a non-sticky surface with the center in a tacky, undried state. Many oils which could be dried either in air or by baking exhibited films having poor flexibility, poor adhesion or poor chemical resistance. The more recent hydrocarbon drying oils which contain $C_4$-$C_6$ conjugated diolefins and which have been polymerized in the presence of sodium as a catalyst have found considerable use as film-forming material in coating compositions, but it has been difficult to cure them satisfactorily. In thin films, the sodium polymerized diolefin oils can be air-dried or baked to give durable, protective films of considerable merit, but even these have been difficult to cure in slightly thick films, such as occur at the fat edge of a coated metal sheet where the coating has accumulated. Attempts to cure such fat edges have included the use of various catalysts such as metallic driers and peroxides.

Another shortcoming common to most hydrocarbon drying oils of the past has been the lack of their compatibility with other film-forming materials or with many of the common oxygenated solvents.

According to the present invention, the curing rate and compatibility of hydrocarbon drying oils containing $C_4$-$C_6$ conjugated diolefins is improved by epoxidizing the oils without introducing more than a small amount of hydroxyl groups. The resulting oil is hereafter referred to as epoxidized hydrocarbon drying oil. Another benefit which results from epoxidizing these oils is their improved functionality and reactivity through oxygen linkages.

The primary object of this invention is to prepare and provide epoxidized hydrocarbon drying oil containing $C_4$-$C_6$ conjugated diolefins.

A further object is to prepare and provide epoxidation derivatives of sodium-polymerized hydrocarbon drying oils of said types, especially the copolymer types prepared from vinyl aromatics and from conjugated diolefins having 4-6 carbons.

These and ancillary objects will be apparent from the following description of my invention.

I have discovered that epoxidation of hydrocarbon drying oils of the types identified above improves the compatibility of the latter with oxygenated solvents and with other film-forming materials, improves the adhesion, pigment-wetting and gloss properties of the oil and improves the curing in thick films and the film-forming properties thereof as compared with the starting oil. I have also found that the epoxy groups provide active centers for cross-linking and other reactions, and for preparing various derivatives having improved properties over the original hydrocarbon oils.

It should be understood that the principles of my invention can be applied to any of the hydrocarbon drying oils presently known. Nevertheless, since the sodium-polymerized diolefin-containing oils, such as polybutadiene and butadiene (60–90%)-styrene (40–10%) copolymer oils have so far come closest to being competitive with glyceride oils in coating compositions, I prefer to epoxidize such oils, and I especially prefer to epoxidize the sodium-polymerized diolefin-vinyl aromatic copolymer oils mentioned above. Typical sodium-polymerized oils of my preferences are disclosed in U.S. application Serial No. 176,771, filed July 29, 1950, now U.S. 2,762,851 and in U.S. Patents Nos. 2,652,342, 2,559,947, 2,631,175, 2,672,425, 2,672,910 and 2,683,162, here incorporated by reference. In general, however, the synthetic oils to which the present invention is applicable are polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e.g., with 0 to 40% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst, such as benzoyl peroxide or cumene hydroperoxide, or in the presence of metallic sodium when the monomers consist of a diolefin or of a mixture of a diolefin with a vinyl aromatic monomer. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150 and 200° C. (Varsol), 3 parts t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% nonvolatile matter content with mineral spirits. The nonvolatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers, such as dioxane. Finally, additional hydrocarbon solvent is preferably distilled off until a product containing about 50%–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e.g., butane, benzene, xylene, naphtha, cyclohexane and the like. The diluents are usually used in amounts ranging from 50 to 500 parts per 100 parts of monomer. The reaction temperature may vary between about 40° C. and 100° C. preferably about 65 to 85° C. As a catalyst, 0.1 to 10 parts of dispersed metallic sodium is used per 100 parts of monomers, sodium particle sizes below 100 microns being particularly effective.

The polymers produced by the above process have molecular weights up to 10,000 and viscosities up to 22 poises at 50% NVM and are pale yellow to colorless liquids.

The oils can be epoxidized effectively by methods known to the art, such as those described in Bulletin No. 16 of the Buffalo Electrochemical Company and in U.S. Patents Nos. 2,485,160, and 2,569,502. I especially prefer, however, to use the process described in the copending application of Radlove and Davis, Serial No. 515,783, filed June 15, 1955.

According to the method described in this copending application, a hydrocarbon drying oil is gradually contacted with hydrogen peroxide at temperatures maintained between about 20° C. and 50° C. in the presence of formic acid and a catalytic amount (e.g., 0.25–2.5% by weight on the oil) of oxygen-containing mineral acid (e.g., sulfuric or phosphoric). A diluent-modifier (e.g., acetic acid or mixtures of acetic acid and water) is desirably present also in an amount between about 10% and 55% by weight on the hydrocarbon oil. In accordance with the principles of the method, performic acid is formed in-situ by reason of the presence of the mineral acid. The process gives good yields of oxirane oxygen with concomitantly low acetyl values, and the treatment can be continued with gradual addition of hydrogen peroxide until a desired oxirane content approaching the theoretical maximum or any lesser content has been secured. The resulting epoxidized oil is then recovered, washed, dried, etc.

The following examples illustrate the principles of my invention and the preparation of my novel products.

*Example 1*

A solution was prepared from 500 parts of mineral spirits (a naphtha boiling range of 160° to 200° C.) and 500 parts of a synthetic, sodium-polymerized butadiene-styrene copolymer drying oil prepared in the manner of Synthesis B above. The oil had an iodine value of 318 and an acetyl value of 2.4. To the foregoing solution of mineral spirits and hydrocarbon drying oil the following materials were added: 26.2 parts of glacial acetic acid, 25.2 parts of 88% formic acid and 7.1 parts of 50% aqueous sulfuric acid. The mixture was placed in a water bath at 30° C. and 72.5 parts of 50% hydrogen peroxide was added. The temperature rose to 45° C. The mixture was cooled to below 40° C. and 72.5 more parts of 50% hydrogen peroxide was added. After three hours of reaction, the concentration of peroxide had decreased to 0.3% and the mass was agitated for one hour longer to insure complete reaction. The reaction mixture was then washed with saturated aqueous sodium chloride, containing about 10% ethyl alcohol, and then with dilute aqueous sodium carbonate. The washed product was centrifuged and freed from the last traces of moisture by filtering the centrifugate through anhydrous sodium sulfate and filter aid. The resultant almost colorless oil had a non-volatile content of 55.2%, an oxirane value of 3.3% on 100% solids basis, an acid value of .54, and an acetyl value of 7.2. The epoxidized product gave surface coatings on steel test panels which after baking at 325° F. for about 20 minutes were superior in hardness and adhesion to the untreated drying oil.

*Example 2*

A portion of the same hydrocarbon drying oil used in Example 1 was epoxidized in a corresponding manner to produce an oil having an oxirane content of 2.6%, an acetyl value of 4.3, an acid value of .32, and an NVM of 52%. The oil yielded a clear film when baked on steel panels for 10 minutes at 400° F.

The epoxidized oils of Examples 1 and 2 were blended with various other film-forming materials in a compatibility test, and compatible or hazy mixtures were baked on glass panels for 30 minutes at 300° F. to observe whether or not compatibility was retained in the cured films. The unepozidized starting oil was carried through the tests as a control. The following table summarizes the results.

TABLE I.—COMPATIBILITY

| Resin | Ratio | Control | | Example 1 | | Example 2 | |
|---|---|---|---|---|---|---|---|
| | | Solution | Film | Solution | Film | Solution | Film |
| Petroleum [1] | 1:1 | Clear | Hazy | Clear | Clear | Clear | Clear. |
| Epoxidized oil [2] | 1:1 | Hazy | Clear | Sl. Haze | Clear | Sl. Haze | Clear. |
| Polyamide [3] | 5%* | Clear | Clear | Hazy | Clear | Hazy | Clear. |

[1] Velsicol AD 63.
[2] Rohm and Haas Paraplex G-62.
[3] General Mills 115.
*By weight on epoxidized oil.

In the copending application of Millar and Radlove, Serial No. 517,096, filed June 21, 1955, now U.S. Patent No. 2,921,947, it is shown that the epoxidized oils can be esterified with carboxylic acids to produce modified oils having additionally improved properties in respect to compatibility with other materials and in respect to film qualities.

For the purposes of the present invention, the hydrocarbon drying oils can be epoxidized any desired amount up to the natural limit imposed by the available unsaturation of the starting oil. The extent of epoxidation increases the polarity of the oils in substantially a linear relationship but at least about .25% oxirane oxygen should be attained in order to secure a significant alteration. I especially prefer to attain an oxirane oxygen content between about 1% and 8% by weight, and for preparing epoxidized oils of the higher oxirane contents, I prefer to use the process described and claimed in the copending application of Radlove and Davis, supra.

I have found that my epoxidized oils give exceptionally good protective and insulating films when cured in contact with copper, as where coatings are applied to copper wire and other forms of electrical copper.

*Example 3*

A polybutadiene drying oil prepared in the manner of Synthesis A above was epoxidized by the method described in the Radlove and Davis application, supra, to an oxirane value of 2.9%. Films of the resulting oil were applied to steel panels and to copper in film thicknesses of about 2 mils. The applied films were then baked 30 minutes at 300° F. Good through-cure was obtained on the steel panels but greater hardness was observed in the films applied to copper.

*Example 4*

A polybutadiene drying oil in the form of a 50% solution in benzene and which had been polymerized with boron trifluoride diethyl ether complex in the manner described in Example 1 of U.S. Patent No. 2,708,639 was epoxidized by the method described in the Radlove and Davis application, supra to an oxirane value of 4.1%. The acetyl value was 11.

The resulting solution of epoxidation derivative (at a non-volatile content of about 52%) was applied to steel panels and baked for one hour at 130° C. The resulting heat-cured films exhibited good adhesion, excellent hardness and good through-cure even in heavy films (4–5 mils).

Having described my invention, what I claim is:

1. A coated metal article having on a surface portion thereof a heat-cured protective film derived by heating a coating composition whose essential film-forming material consisted of at least one epoxidized material having an oxirane oxygen content between about .25% and 8% by weight and having substantially all of its combined oxygen in the form of oxirane oxygen, the latter having been prepared from sodium-polymerized, hydrocarbon oil having drying qualities and composed essentially of polymers derived from 60–100% of at least one conjugated diolefin of 4–6 carbons, balance at least one vinyl aromatic monomer selected from the group consisting of styrene and ring-substituted alkyl styrenes having 1–2 carbons in each alkyl group, said coated metal article being characterized by improved adhesion of the cured protective film to said metallic surface portion, by improved hardness in the cured film and by good through-cure, in comparison with comparably heated films of the same hydrocarbon polymer oil in its original unepoxidized condition.

2. A metal article as claimed in claim 1 wherein the metal of said article is copper.

3. A metal article as claimed in claim 2 wherein the epoxidized material has an oxirane oxygen content between about 1% and 8% by weight.

4. A metal article as claimed in claim 1 wherein the metal of said article is essentially ferruginous.

5. A metal article as claimed in claim 4 wherein the epoxidized material has an oxirane oxygen content between about 1% and 8% by weight.

6. A metal article as claimed in claim 1 wherein the epoxidized material has an oxirane oxygen content between about 1% and 8% by weight.

7. A metal article as claimed in claim 1 wherein the sodium-polymerized hydrocarbon polymer oil which has been epoxidized is a copolymer oil prepared from 60–90% butadiene and 10–40% styrene.

8. A metal article as claimed in claim 7 wherein the oxirane oxygen content of the epoxidized oil is between about 1% and 8%.

9. A coating composition whose film-forming component is an organic solvent solution of film-forming material, said film-forming component having as its essential film-forming moiety (A) at least 50% by weight of at least one epoxidized material secured from sodium-polymerized hydrocarbon drying oil which has a molecular weight below about 10,000 and which has been prepared from 60–100% by weight of $C_4$–$C_6$ conjugated diolefin, balance vinyl aromatic monomer selected from the group consisting of styrene and ring-substituted alkyl styrenes having 1–2 carbons in each alkyl group, and which after being polymerized has been epoxidized to an oxirane oxygen content between about .25% and 8% by weight so as to have substantially all of its combined oxygen in the form of oxirane oxygen, and (B) as the remainder, modifying film-forming material which is compatible with said epoxidized material and which in the absence of said oxirane oxygen content in said epoxidized material would be incompatible therewith when said coating composition has been heat-cured.

10. A coating composition as claimed in claim 9 wherein said epoxidized material has an oxirane oxygen content of between about 1% and 8% by weight.

11. A coating composition as claimed in claim 10 wherein the hydrocarbon drying oil of said essential film-forming moiety consists of oil prepared from about 80% butadiene and 20% styrene.

12. A coating composition as claimed in claim 11 which includes oxygenated organic solvent which is compatible with said epoxidized material but which would be incompatible therewith in the absence of said oxirane oxygen content.

13. A coating composition as claimed in claim 10 which includes oxygenated organic solvent which is compatible with said epoxidized material but which would be incompatible therewith in the absence of said oxirane oxygen content.

14. A coated metal article having on a surface portion thereof a heat-cured protective film derived from a coating composition whose essential film-forming material consisted of at least one epoxidized material having an oxirane oxygen content between about .25% and 8% by weight and having substantially all of its combined oxygen in the form of oxirane oxygen, the latter epoxidized material having been prepared from hydrocarbon polymer oil having drying qualities and composed essentially of polymers derived from 60–100% of at least one conjugated diolefin of 4–6 carbons, balance at least one vinyl aromatic monomer, said coated metal article being characterized by improved adhesion of the cured protective film to said metallic surface portion, by improved hardness in the cured film and by good through-cure, in comparison with a comparably heated film of the same hydrocarbon polymer oil in its original unepoxidized condition.

15. A coating composition whose film-forming component which is an organic solvent solution of film-forming material, said film-forming component having as its essential film-forming moiety (A) at least 50% by weight of at least one epoxidized material secured from hydrocarbon drying oil which has a molecular weight below about 10,000 and which has been prepared from 60–100% by weight of $C_4$–$C_6$ conjugated diolefin, balance vinyl aromatic monomer, and which after being polymerized has been epoxidized to an oxirane oxygen content between about .25% and 8% by weight so as to have substantially all its combined oxygen in the form of oxirane oxygen, and (B) as the remainder, modifying film-forming material which is compatible with said epoxidized material and which in the absence of said oxirane oxygen content in said epoxidized material would be incompatible therewith when the said coating composition has been heat-cured.

16. A coating composition adapted for curing by baking, said composition having as the film-forming component thereof at least one epoxidized material secured by epoxidation of a hydrocarbon drying oil prepared from at least 60% by weight of conjugated diolefin having 4 to 6 carbon atoms, said epoxidized material having an oxirane oxygen content between about .25% and 8% by weight and having substantially all of its combined oxygen in the form of oxirane oxygen.

References Cited in the file of this patent

UNITED STATES PATENTS

| | | |
|---|---|---|
| 2,569,502 | Swern | Oct. 2, 1951 |
| 2,651,856 | Newton | Sept. 15, 1953 |
| 2,674,586 | Welch | Apr. 6, 1954 |
| 2,692,892 | Hillyer et al. | Oct. 26, 1954 |
| 2,753,323 | Farnham | July 3, 1956 |
| 2,753,385 | Gleason | July 3, 1956 |
| 2,755,290 | Mueller | July 17, 1956 |
| 2,765,296 | Strain | Oct. 2, 1956 |
| 2,780,664 | Serniuk | Feb. 5, 1957 |
| 2,792,382 | Edmunds | May 14, 1957 |
| 2,819,302 | Koenecke et al. | Jan. 7, 1958 |
| 2,842,513 | Fitzgerald et al. | July 8, 1958 |
| 2,907,669 | Tulk et al. | Oct. 6, 1959 |
| 2,963,455 | Rowland et al. | Dec. 6, 1960 |

FOREIGN PATENTS

| | | |
|---|---|---|
| 885,886 | France | Sept. 28, 1943 |